Figure 1:
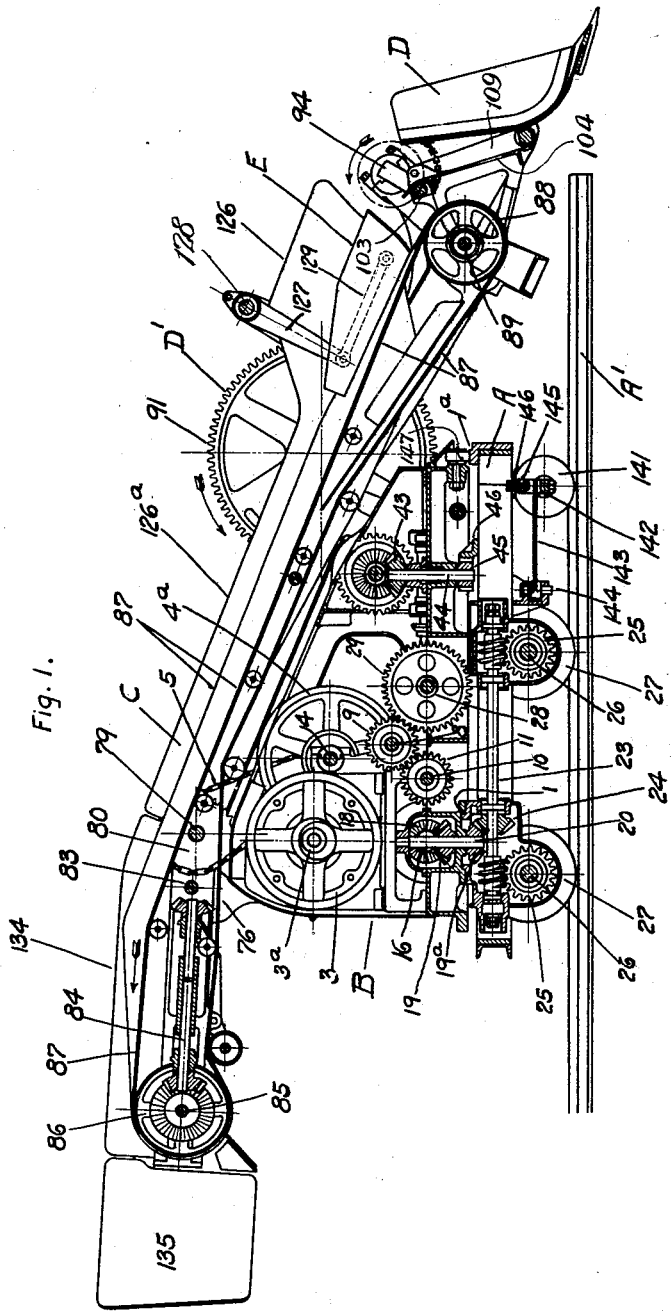

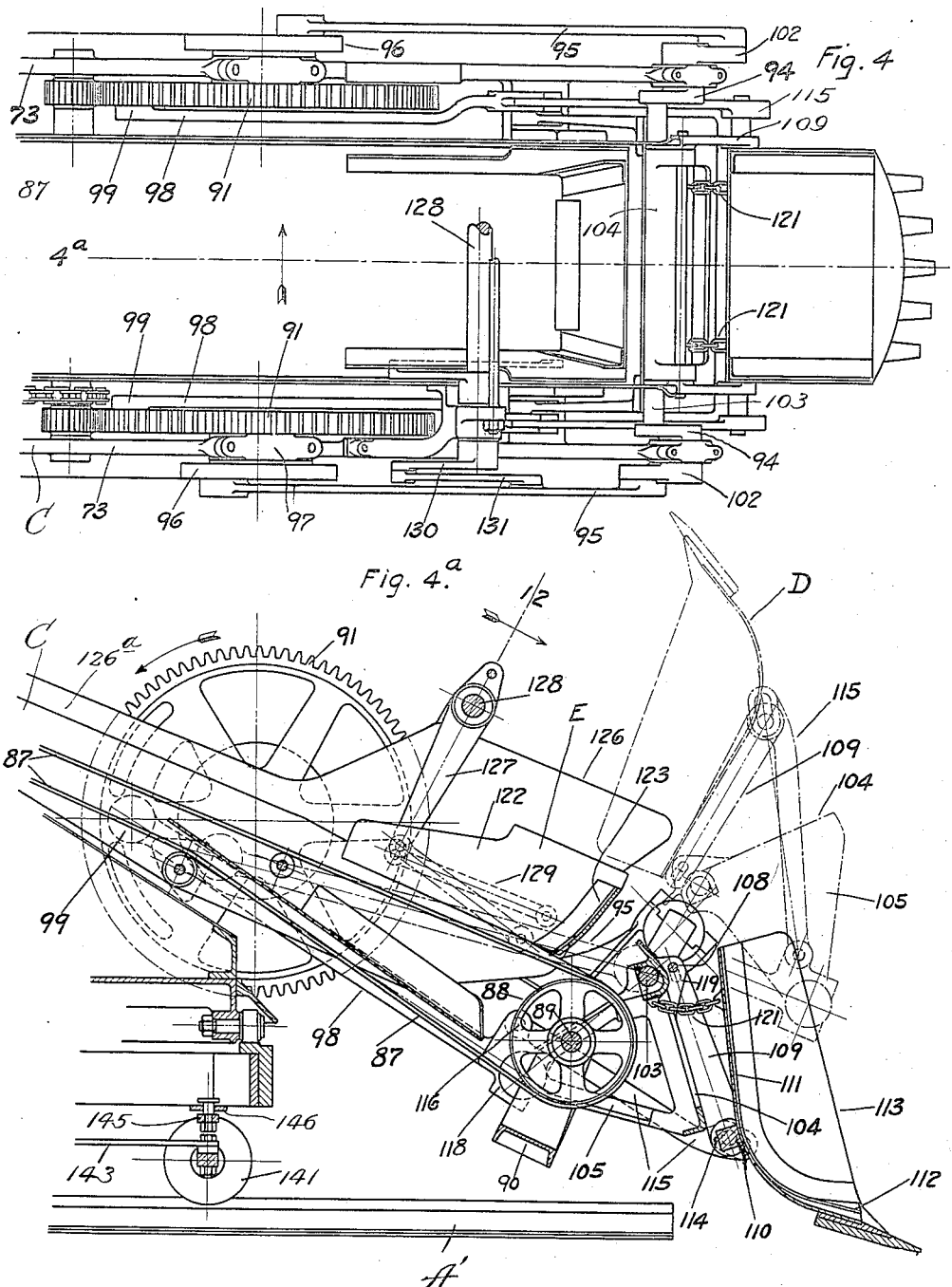

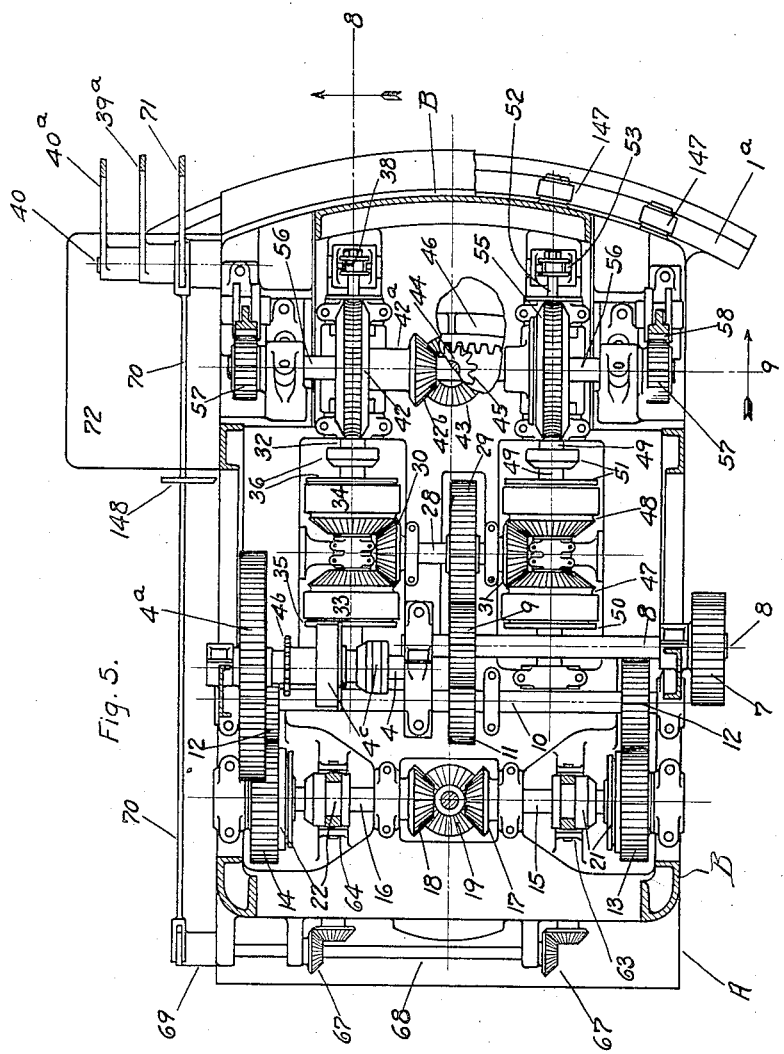

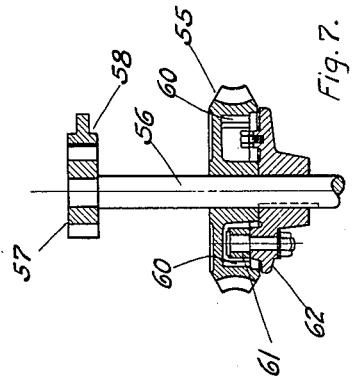
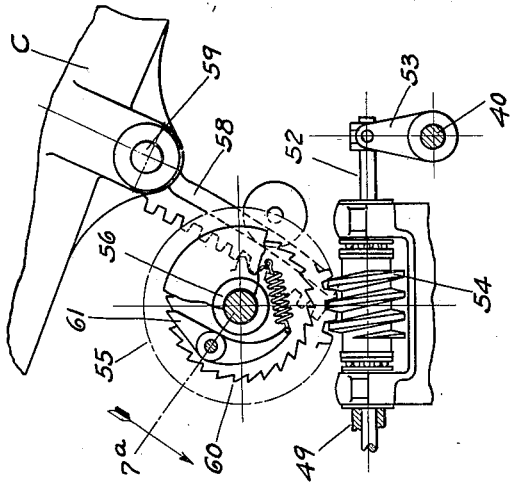
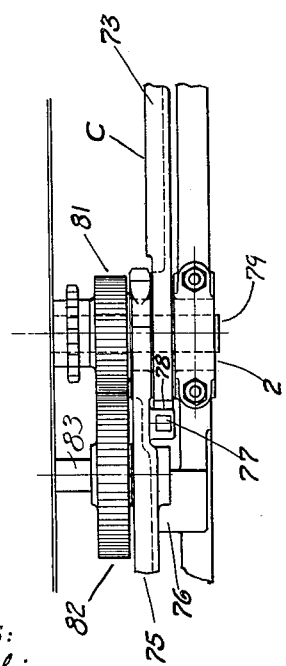
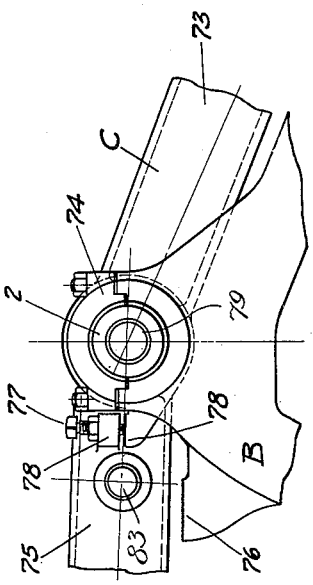

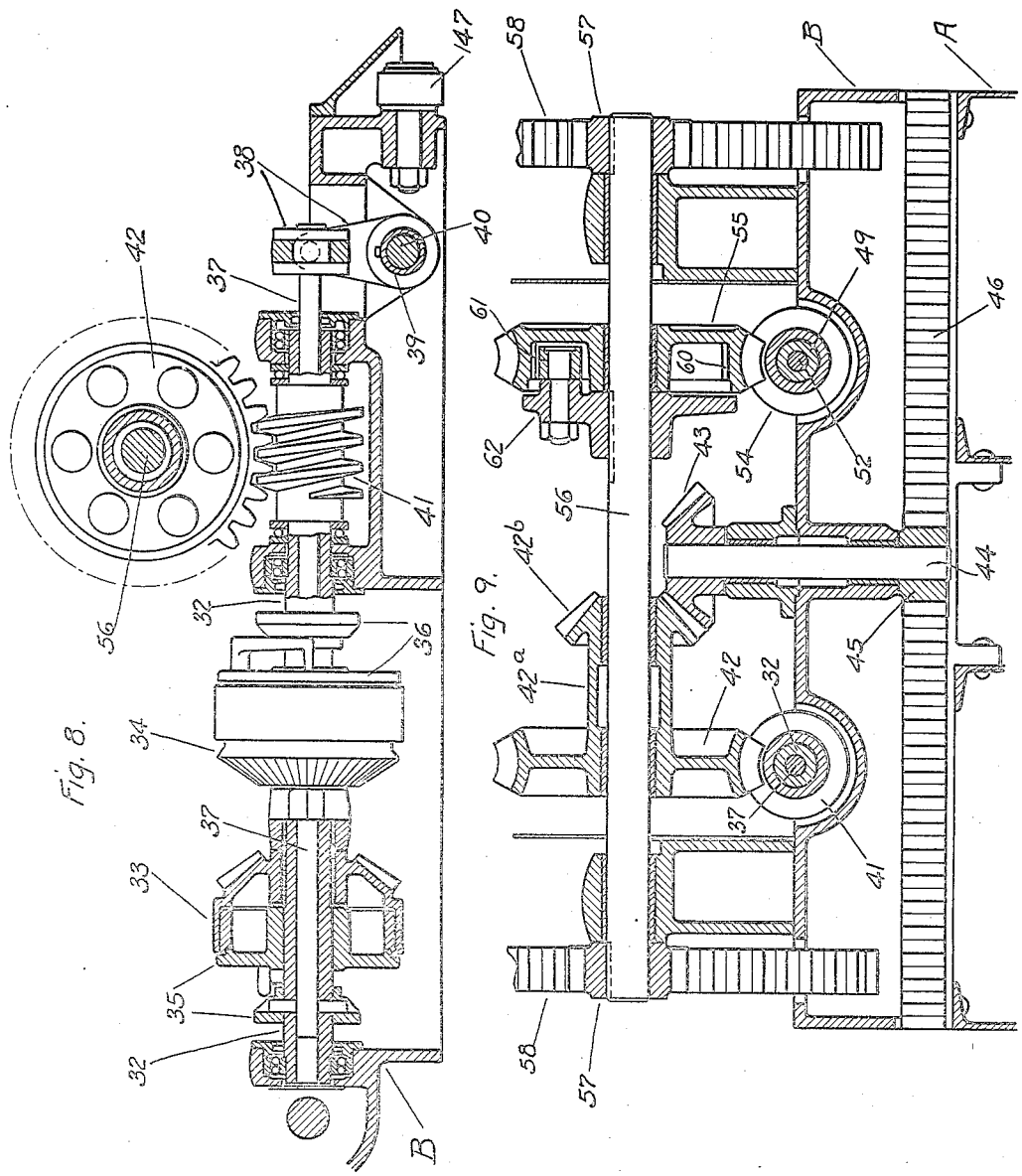

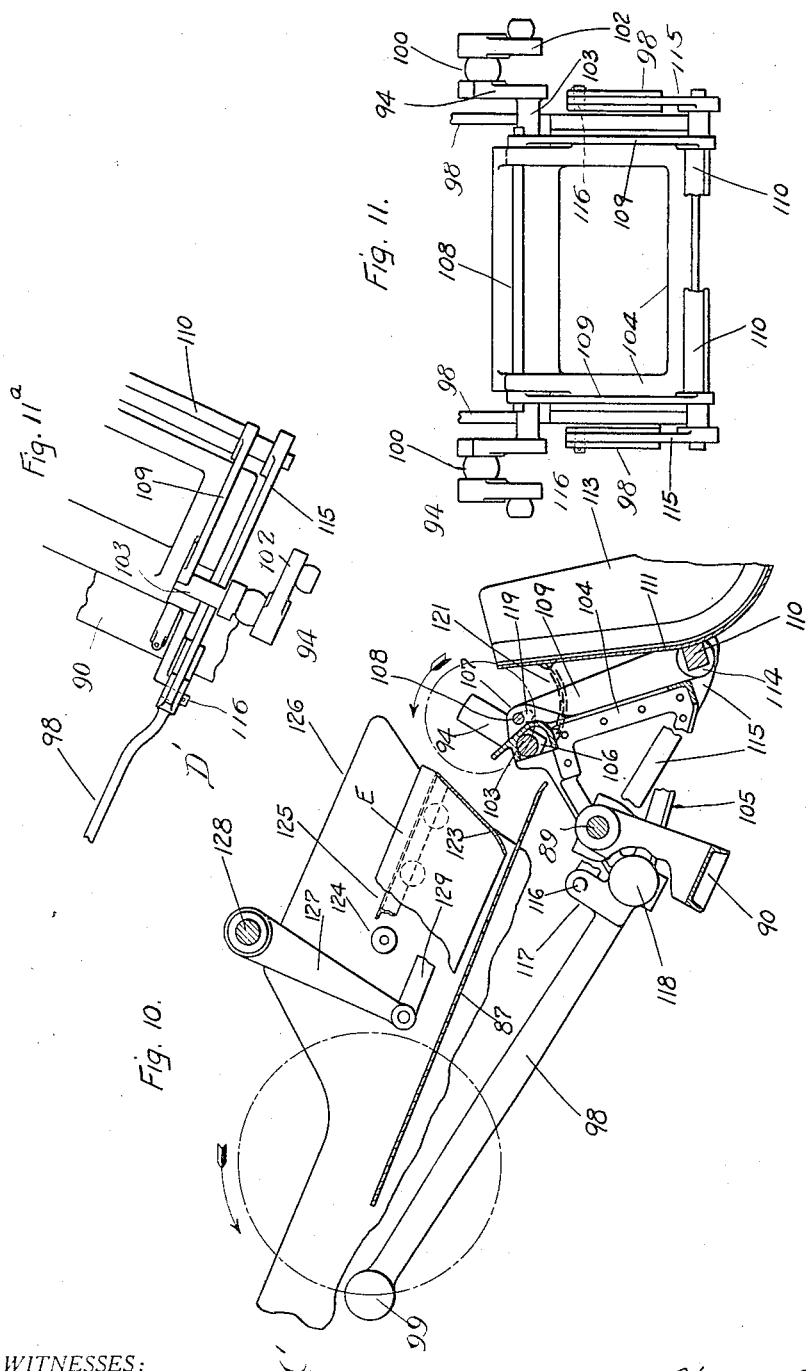

V. G. HALBY.
LOADER.
APPLICATION FILED APR. 26, 1915.

1,284,659.

Patented Nov. 12, 1918.
11 SHEETS—SHEET 11.

WITNESSES:
Nels P. Flodin
Alex. Finlay

INVENTOR.
Viggo G. Halby
BY
Dyrenforth Lee Chritton & Wiles
ATTORNEYS.

UNITED STATES PATENT OFFICE.

VIGGO G. HALBY, OF MARQUETTE, MICHIGAN, ASSIGNOR TO EUREKA MUCKING & ENGINEERING COMPANY, OF CRYSTAL FALLS, MICHIGAN, A CORPORATION OF MICHIGAN.

LOADER.

1,284,659.   Specification of Letters Patent.   Patented Nov. 12, 1918.

Application filed April 26, 1915. Serial No. 24,120.

*To all whom it may concern:*

Be it known that I, VIGGO G. HALBY, a citizen of the United States, residing at Marquette, in the county of Marquette and State of Michigan, have invented a new and useful Improvement in Loaders, of which the following is a specification.

This invention relates to machines for loading various materials, such as ore, coal, earth, sand, gravel, or the like.

The primary object of the invention is to provide a machine of simple, compact and durable construction, which can be operated with facility, and which is capable of expeditiously handling large quantities of materials.

The accompanying drawings illustrate the invention, in its preferred embodiment, as adapted to operate in mine workings, tunnels, and in analogous situations where the room is limited. While the machine is particularly well adapted for use where the head room is low, it may be advantageously used in open places for the loading of loose ore, earth, sand, gravel, and like materials; and also for excavating and loading loose earth, sand, gravel, and other easily loosened materials.

In the drawings—

Figure 2:
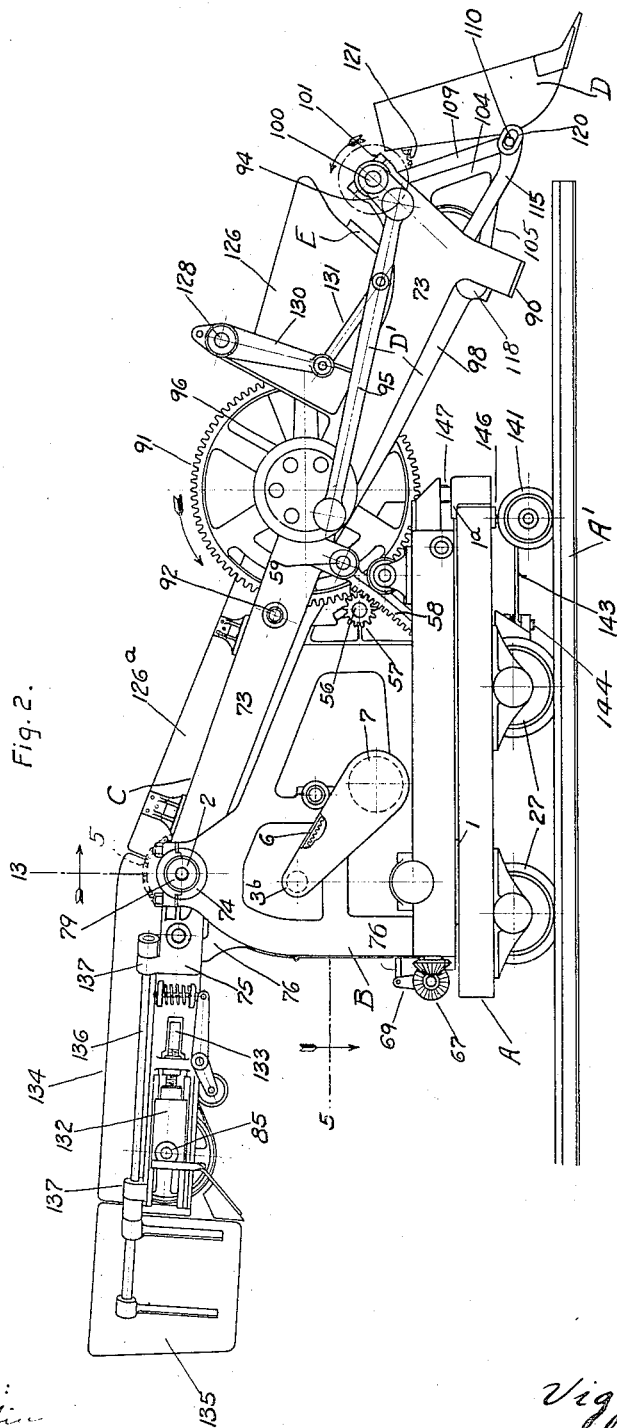
Figure 3:
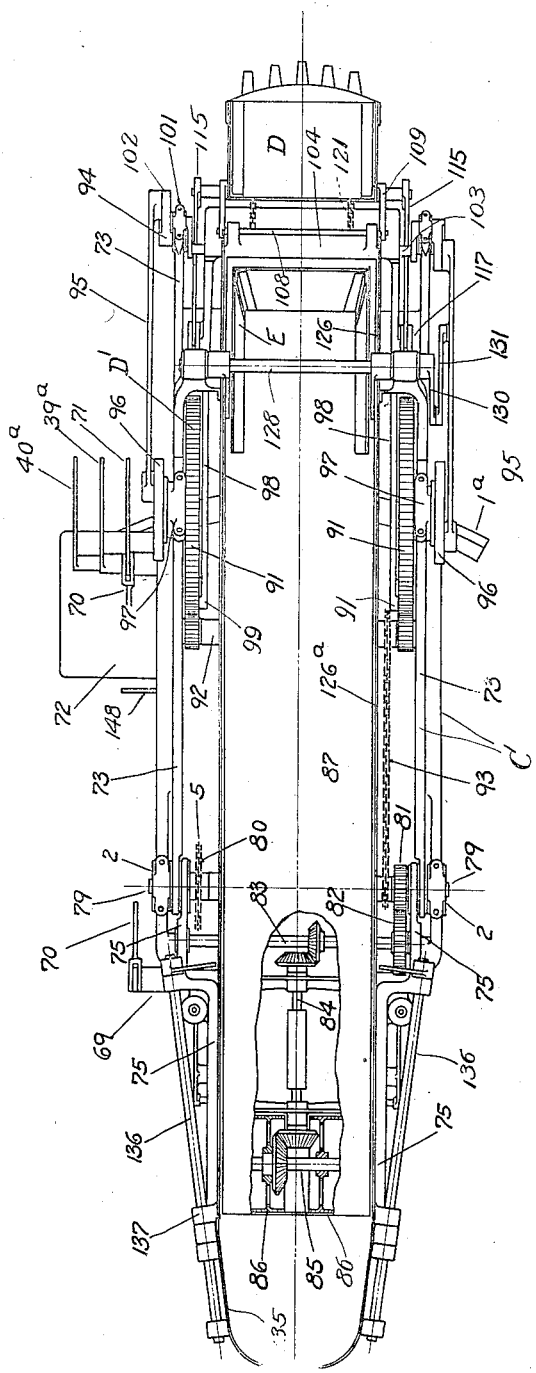
Figure 12:
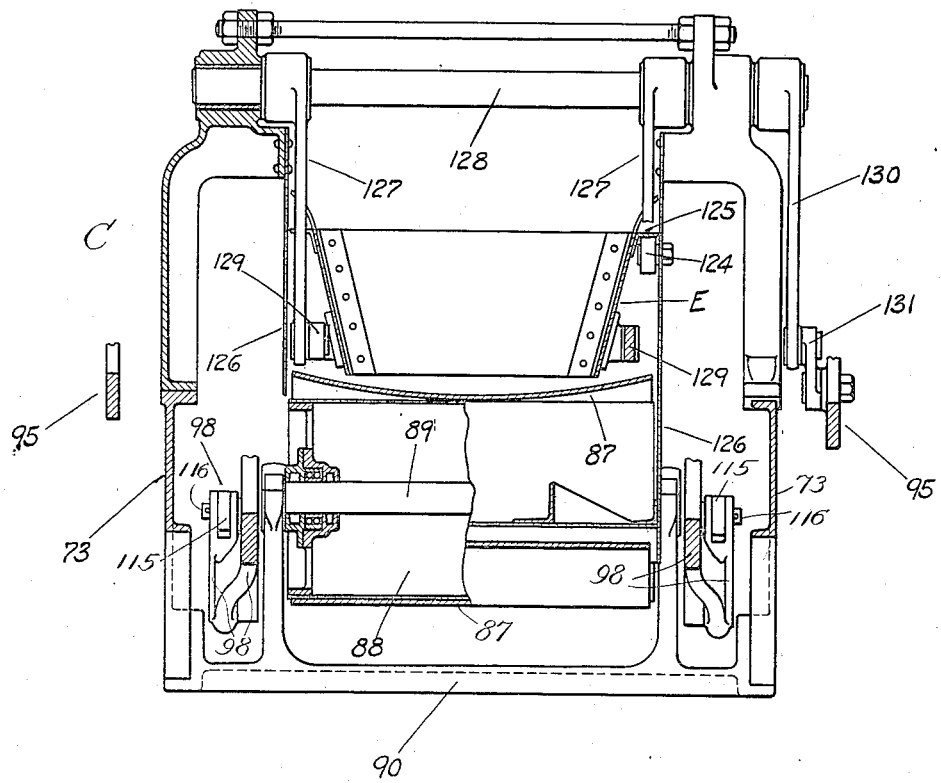
Figure 13:
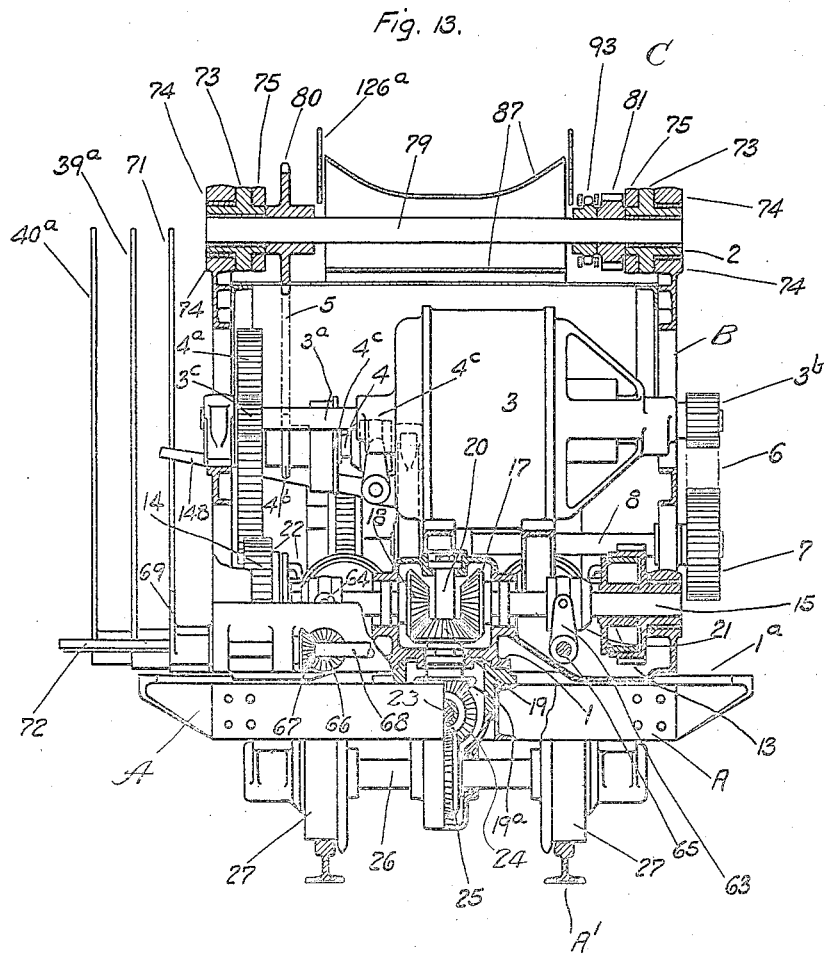
Figure 14:
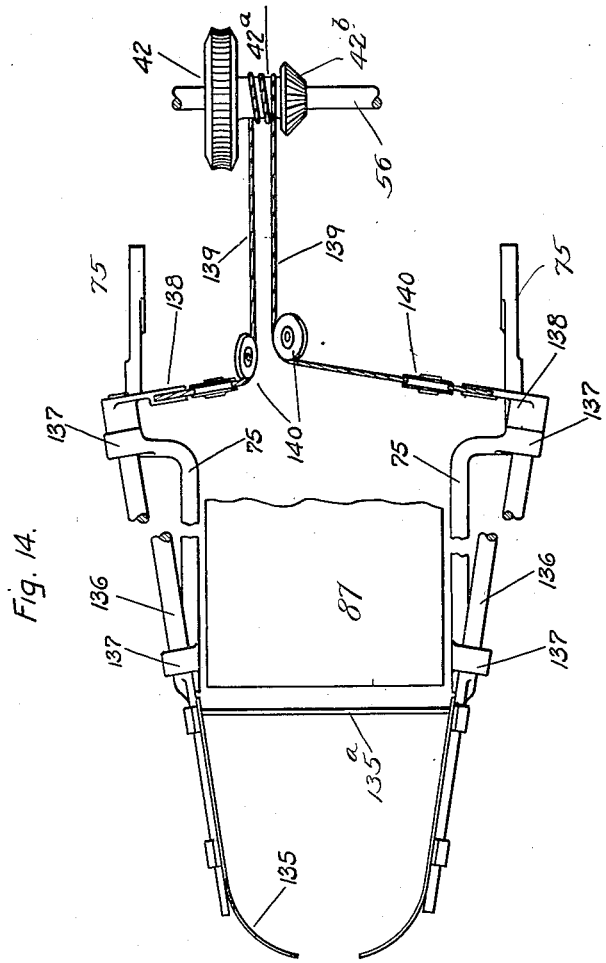

Figure 1 represents a longitudinal sectional view of a loader embodying the invention; Fig. 2, a side elevational view of the same, one part being shown brokenly; Fig. 3, a plan view of the same; Fig. 4, a broken plan view of the front end of the conveyer and the power-actuated shovel mounted thereon; Fig. 4ª, a broken vertical longitudinal section taken as indicated at line 4ª of Fig. 4, the loading position of the shovel being shown in full lines and the discharge position of the shovel being shown in dotted lines; Fig. 5, a plan sectional view taken approximately as indicated at line 5 of Fig. 2; Fig. 6, a broken side elevational view showing one of the trunnions connecting the conveyer mechanism with the intermediate frame or car-body of the machine; Fig. 6ª, a broken plan view of the same portion of the mechanism; Fig. 7, a detail view of the mechanism for raising and lowering the boom on which the endless conveyer and shovel mechanism are mounted; Fig. 7ª, a section taken as indicated at line 7ª of Fig. 7; Fig. 8, an enlarged vertical sectional view taken as indicated at line 8 of Fig. 5; Fig. 9, a transverse vertical section taken as indicated at line 9 of Fig. 5; Fig. 10, a sectional view similar to Fig. 4ª, but with some of the parts omitted; Fig. 11, a view at the front end of the conveyer, showing the mounting for the shovel; Fig. 11ª a plan view of the same; Fig. 12, a transverse vertical section taken as indicated at line 12 of Fig. 4ª; Fig. 13, a transverse vertical section taken approximately as indicated at line 13 of Fig. 2; Fig. 14, a broken plan view, partly diagrammatic, depicting a pair of deflectors employed at the discharge end of the conveyer, and illustrating the manner of operating the same; and Fig. 15, a rear end view of said deflectors.

In the preferred embodiment, which is that illustrated, A represents a power-actuated truck which is mounted on a track A' and which is at all times within the control of the operator; B, an intermediate frame or car-body whose rear portion has swivel connection with the rear portion of the truck A, as indicated at 1, and the front end of which may be swung laterally in either direction on a curved track 1ª, with which the front end of the truck is provided, by mechanism within the control of the operator; C, conveyer mechanism connected, by trunnions 2, to the rear upper portion of the intermediate frame B, said conveyer mechanism being connected with conveyer tilting mechanism mounted on the front portion of the car-body B; D, a shovel mounted on the front end of the conveyer mechanism and carried and actuated by shovel-actuating mechanism D' mounted on the front portion of the conveyer mechanism; and E, an oscillating chute or distributer which receives the materials from the rearwardly-dumping shovel and distributes the same on the conveyer-belt.

The truck-frame A and superposed body B are of comparatively short length; and the body B is surmounted by the conveyer mechanism which has a forwardly and downwardly inclined front portion which projects in front of the truck, and a substantially horizontal rear portion which overhangs or projects in the rear of the truck. In practice, an ore-car, or other burden-car, may be mounted on the track A' in the rear of the truck, in such position as to receive the materials discharged from the rear end of the conveyer.

The truck, the car-body, and the boom or conveyer-frame are made strong and substantial, in order to withstand the stresses when the truck is propelled forwardly, according to the preferred method of operation, whereby the momentum of the machine as a whole may be used to aid in forcing the shovel into the materials in the shovel-filling operation, it being noted, however, that the shovel-actuating mechanism itself operates to carry the shovel through the filling and discharging cycle of operations.

The power-plant is mounted on the intermediate frame or body B. It comprises, in the illustration given, an electric motor 3 (Figs. 1 and 13) mounted on a shaft $3^a$, said shaft being equipped at one end with a sprocket or chain-wheel $3^b$ and at the opposite end with a pinion $3^c$; a counter-shaft 4 driven from the pinion $3^c$ through the medium of a large spur-gear $4^a$, the counter-shaft 4 being equipped with a sprocket-wheel $4^b$ from which power is transmitted through a chain 5 to the endless conveyer, it being noted that the sprocket-wheel $4^b$ is formed integrally with a sleeve journaled on the shaft 4 and equipped with clutch mechanism $4^c$, whereby the sprocket-wheel $4^b$ may be connected, at will, to rotate with the shaft 4; a sprocket-chain 6 connecting the sprocket-wheel $3^b$ with a sprocket-wheel 7 secured on the outer end of a shaft 8, the shaft 8 being equipped near the longitudinal center of the machine with a pinion 9; a shaft 10 driven from the pinion 9 by means of a pinion 11; gears 12 secured on the shaft 10 near the ends thereof and serving to rotate gears 13 and 14 which are journaled to turn freely on shafts 15 and 16, whose inner ends are equipped with bevel gears 17 and 18, which engage an intermediately disposed bevel gear 19 which is secured to a vertical shaft 20 which is journaled concentric with the swivel connection 1 between the rear end of the truck and the rear end of the body B; clutch-devices 21 and 22, mounted on the shafts 15 and 16 and serving to connect either one of the gears 13 and 14, at will, so as to cause the corresponding shaft 15 or 16 to rotate; a longitudinally-disposed worm-shaft 23 journaled in the truck A and actuated from the bevel-gear $19^a$ through the medium of a bevel gear 24, the worm-shaft 23 being equipped with worms which mesh with worm-wheels 25 secured on axles 26 to which the traction-wheels 27 of the truck are secured; a shaft 28 actuated from the spur-gear 4 through the medium of a spur-gear 29, the opposite ends of the shaft 28 being equipped with bevel gears 30 and 31; mechanism for controlling the lateral swing of the body B about the swivel connection 1, comprising a longitudinal tubular shaft 32 (Figs. 5 and 8); a pair of bevel gears 33 and 34 actuated by the bevel gear 30 and journaled to turn freely on the shaft 32, clutch-devices 35 and 36 mounted on the shaft 32 and adapted to connect either one of the gears 33 or 34 with the shaft 32, thereby to cause the shaft 32 to rotate in either direction, at will; a clutch-shifting rod 37 extending through the shaft 32 and which may be shifted by means of an arm or yoke 38 secured on a transversely-extending rock-sleeve 39, which, in turn, is journaled on a rock-shaft 40, the rock-sleeve 39 being controlled by a lever $39^a$ (Fig. 5) and the rock-shaft 40 being controlled by a lever $40^a$; a worm 41 secured on the front portion of the tubular shaft 32 and serving to actuate a worm-wheel 42 which is formed integrally with a sleeve $42^a$ having a bevel pinion $42^b$ which meshes with a co-acting pinion 43 secured on the upper end of a vertical shaft 44 whose lower end is equipped with a pinion 45 which engages a curved segmental rack 46 which is fixedly secured to the truck frame near the front end thereof, as will be understood from Figs. 1 and 5; a pair of bevel gears 47 and 48 actuated by the bevel pinion 31 and journaled freely on a longitudinal tubular shaft 49, the gears 47 and 48 being controlled by clutch-devices 50 and 51, which are similar to the clutch-devices 35 and 36, and which are actuated by means of the longitudinal clutch-shifting rod 52 controlled by an arm or yoke 53 (Figs. 5 and 7) which is secured on the inner extremity of the rock-shaft 40; and a worm 54 secured on the front end of the tubular shaft 49 and which serves to actuate a worm-gear 55 which is journaled on a transverse shaft 56 (Figs. $7^a$ and 9), the shaft 56 being equipped at its ends with pinions 57 which engage rack-bars 58 whose upper ends are connected, by pivots 59, with the boom or frame of the conveyer C. The worm-wheel 55 is journaled freely on the shaft 56 and is equipped with internal ratchet-teeth 60 which co-act with a pawl 61 carried by a mounting 62 which is splined on the shaft 56. This form of connection affords a safety feature interposed in the mechanism for raising and lowering the boom, the ratchet-device permitting slippage in the event that the shovel, in its descent, strikes an obstruction, such as would arrest or tend to elevate the front end of the boom. Thus, the boom may, in such emergency, move relative to its actuating mechanism, to prevent the car-body from being lifted from the truck, or any other injury to the machine, while the raising and lowering mechanism, on the other hand, is always operative to effect raising or lowering of the boom when the obstruction is removed.

As has been indicated, the clutches 21 and 22 control the propelling mechanism of the machine, that is, the traction mechanism. The clutches 21 and 22 are, in turn, controlled by yokes 63 and 64 carried by longitudinal rock-shafts 65 and 66, which have their rear ends equipped with bevel-gears which engage bevel-gears 67 secured on a transverse rock-shaft 68 which is actuated by an arm 69 joined by a connecting rod 70 to the lever 71.

From the foregoing, it will be understood that the machine is propelled or driven on the track A' by propelling mechanism controlled by the lever 71; that the lateral swing of the intermediate frame or car-body on the truck is controlled by the lever 39a; and that the raising and lowering of the boom is controlled by the lever 40a—these several levers being conveniently mounted with relation to the platform 72 upon which the operator stands.

The clutch 4c may be thrown to clutch the sprocket-wheel 4b to the shaft 4, so that the conveyer driving chain 5 will be continuously operated. Any suitable means as a hand-lever 148, may be employed for operating the clutch 4c.

The front portion of the frame of the conveyer mechanism C affords a boom, on the front part of which the shovel mechanism is mounted. The boom frame comprises the inclined longitudinal front side-members 73 which are provided at their rear ends with the tubular trunnions 2 which are received in substantial bearings 74 with which the rear upper portion of the intermediate frame or body B is provided; and rear side-members 75 which are pivoted on inward extensions of the trunnions 2. As will be understood from Figs. 6 and 6a, the rear portion of the conveyer-frame is adapted to counterbalance, to a large extent, the front portion of the conveyer-frame, or boom. Articulate connections are employed between the frame-members 73 and 75, however; and the construction is such that the counter-balancing effect will be secured until the front end of the boom is raised a certain distance, when the rear frame-member 75 will rest upon shoulders 76 with which the intermediate frame B is provided in the rear of the trunnions 2. The members 75, whose front ends are journaled concentrically with the trunnions 2, are equipped with adjustable stops or set-screws 77 which bear upon shoulders or knuckles 78, with which the members 73 are equipped in the rear of the trunnion connections. Thus, the frame-members 75 will be supported normally, through the medium of the set-screws 77, on the shoulders or short arms of the frame-members 73; but should the front ends of the frame-members 73 be unduly raised, the members 75 would rest upon the shoulders 76, when the rear end of the conveyer is in substantially a horizontal position.

Journaled in the trunnions 2 and concentric therewith is a conveyer-actuating shaft 79 equipped with a sprocket-wheel 80, which is actuated by the sprocket-chain 5. Power is transmitted from the shaft 79, through gears 81 and 82, to a shaft 83 disposed in the rear of the shaft 79 and journaled in the frame-members 75. From the shaft 83 power is transmitted through bevel-gears to an extensible longitudinal shaft 84, the rear end of which is connected by bevel-gears with a transverse shaft 85 which carries the drums 86, upon which the rear end of the endless conveyer 87 is mounted.

The endless conveyer passes over and about suitable idlers, and has its front end mounted on a drum 88 carried by a shaft 89 journaled in short standards carried by a cross-member 90 (Fig. 12) which is secured to the front ends of the side-members 73 of the boom-frame.

The shovel D is carried by the shovel-actuating machinery D' mounted on the front portion of the boom-frame. The shovel-actuating mechanism comprises a pair of large gears 91 supported on the frame-members 73 of the boom and actuated by pinions mounted on a shaft 92 which is actuated from the shaft 79 by a sprocket-chain 93; a crank-shaft 94 journaled in the front ends of the members 73 of the boom-frame and actuated by pitman-rods 95 whose front ends are connected with crank disks or crank-arms 96 which are secured to rotate with the gear-wheels 91, the gear-wheels 91 and the crank-disks 96 being secured on opposite ends of shafts journaled in bearings 97 with which the frame-members 73 are provided; and connecting-rods 98 whose rear ends are connected with wrist-pins 99 carried by the gear-wheels 91.

The shovel D is carried by a mounting which is suspended from the continuously-rotating crank-shaft 94, the arrangement being such that the discharge-end of the shovel will be carried by the crank, which acts as an orbitally-moving pivot; and the connecting rods 98 serve to impart a forward thrust to the point portion of the shovel during the filling operation and also to turn the shovel about its orbitally-moving pivot and cause it to assume the rearwardly-dumping position shown by dotted lines in Fig. 4a.

It will be understood from Figs. 10 and 11, the crank-shaft has the journal-portions 100 mounted in bearings 101 (Fig. 3) of the frame-member 73; the outer crank arms 102 with which the pitmen 95 are connected; and the offset main portion or shovel-carrying pivot 103 from which the shovel is suspended at its discharge end. The shovel is carried by a transversely-disposed rectangular frame 104, to the end portions of which are secured triangular arms 105, the construction being such as to afford substantially vertical slots 106, through which the shovel pivot 103 of the crank-shaft extends. Thus, the frame 104 is capable of limited vertical movement with relation to the crank-shaft, from which it is suspended. The frame 104 is provided at its upper portion with forwardly-extending lugs 107 which support a pivot or pivots 108, from which are suspended links 109, whose lower ends support a bar or shaft 110.

The shovel comprises a back-portion 111 and forwardly-turned point-portion 112 and sides 113. At an intermediate portion of the shovel, some distance back of the point, the shovel-back is provided with lugs or ears 114, which are secured on the shaft or bar 110. As indicated, the end-portions of the bar 110 are made round where they extend through the lower portions of the links 109, and the extremities of the shaft 110 are extended a suitable distance and connected with links 115, whose rear ends are connected, by pivots 116, with ears 117 carried by the front ends of the connecting-rods 98, the front ends of the connecting-rods 98 being also connected, by substantial pivots 118, to the rear ends of the triangular arms 105. The rear edges of the shovel suspension links 109 bear against the front side of the frame 104 when the operation of filling the shovel begins, and the main thrust is transmitted, at such time, through the triangular arms 105 to the main pivots 118 at the front ends of the connecting-rods 98. During the filling operation, the orbitally-moving shovel-pivot 103 traverses the lower arc of its orbit in a forward direction, and the shovel-mounting 104 is gradually turned about the orbitally-moving pivot. After the shovel is practically filled, the thrust links 115 come into action, causing the suspension links 109 to swing forwardly and upwardly about the pivot 108, the links 109 being swung farther and farther from the frame 104, so that the shovel will assume the discharging position indicated by dotted lines in Fig. 4ª, notwithstanding the fact that the main frame of the shovel-mounting is turned through a smaller arc.

The upper ends of the shovel-suspension links 109 are provided with slots 119, which engage the pivot 108, and the front ends of the thrust-links 115 are provided with slots 120 which engage the extremities of the shaft 110. The shovel is capable of limited turning movement about the pivot-shaft 110, the upper or discharge end of the shovel being connected, by chains 121, to the frame 104.

From the description given, it will be understood that the main shovel-mounting is capable of limited movement with relation to the orbitally-moving pivot 103, and that the shovel is also capable of limited movement with relation to its mounting, because of the lost motion connections employed. This enables the shovel to adjust itself to conditions in the shoveling operation.

It will be noted that the main gear-wheels 91, through which power is communicated to the shovel, are mounted adjacent the inner sides of the frame-members 73 of the boom; that the crank-disks 96 are at the outer sides of said frame-members; that the pitmen 95 which operate to continuously turn the crank shaft 94 are disposed at the outer sides of the frame-members 73; and that the connecting-rods 98, which serve to thrust the point of the shovel into the materials, operate between the arms of the crank-shaft which carry the orbitally-moving pivot 103 and in the space between the frame-members which support the front end of the endless conveyer and the frame-members 73. As will be understood from Fig. 4ª, the discharge end of the shovel D is open; and when the shovel is in the inverted position indicated by the dotted lines, the shovel-contents will be discharged upon the lower end of the endless conveyer. To insure the discharged materials being properly lodged on the conveyer, it is preferred to employ a reciprocating distributer E, which, when the shovel, is in the position shown by the dotted lines in Fig. 4ª, will be at the rear end of its stroke and in position to permit the materials to be discharged into said member E. As the member E moves forwardly and upwardly, the materials are distributed upon the conveyer-belt. It will be understood that the position of the member E illustrated in Fig. 4 corresponds with the full-line position of the shovel in said figure. The member E comprises sides 122 and an end 123. In other words, the member E is a U-shaped member, open at the top and bottom, so that the materials may pass therethrough and lodge upon the conveyer-belt. The sides of the member E are provided with L-form rails 125, which slide on rollers 124 mounted on stub-shafts fastened to sheet-metal side-pieces which are rigid with or form a part of the boom-frame. The member E is reciprocated in the direction of the length of the boom, by means of arms 127, which depend from a rock-shaft 128, the lower ends of the arms 127 being connected, by links 129, with the sides of the member E. The rock-shaft 128 is oscillated through the medium of an arm 130, which is connected by a link 131 to one of the pitman-rods 95.

The sheet metal side-pieces 126 between which the reciprocating bottomless hopper E moves are made high enough to prevent materials discharged from the shovel from falling over the sides of the conveyer, and these sheet metal members 126 are extended, with reduced height, as indicated at 126ª, up to the vicinity of the trunnions of the boom-frame.

The shaft 85, which carries the drum about which the upper end of the endless conveyer passes, is mounted in adjustable bearings 132 carried by the rear frame-members 75 of the conveyer-frame, the bearings 132 being adjusted by means of adjusting-devices 133. This enables the proper tension to be given to the conveyer-belt, and it will be understood that the extensible shaft 84, through which motion is communicated to the shaft 85, has its length automatically adjusted in accordance with the adjustment of the bearings 132. Corresponding with the sheet metal side-pieces 126ª, the rear portion of the conveyer-frame is equipped with sheet metal side-pieces 134, which project upwardly from the edges of the conveyer-belt. The upper or operating portion of the conveyer-belt is preferably so supported on idlers as to curve the belt in cross-section, in the manner illustrated in Fig. 13, thus tending to keep the materials on the belt.

Figure 15:
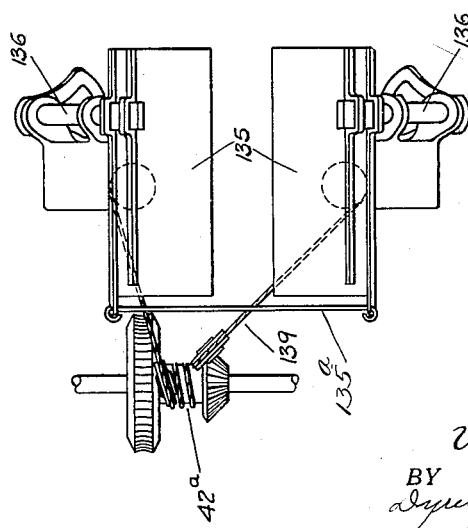

As will be understood from Figs. 2, 14 and 15, the rear end of the conveyer-frame is preferably equipped with a pair of guide-members or chute-members 135, which are automatically swung upon longitudinal, substantially horizontal axes, so that the lower ends of the members or deflectors 135 will point in the opposite direction from the direction in which the rear end of the conveyer swings when the intermediate frame or car-body B has its front end swung laterally to direct the shovel to one side or the other of the track. The purpose of the deflectors 135 is to direct the materials discharged from the rear end of the conveyer-belt toward the center of the car which is being filled, regardless of the lateral swing of the rear end of the conveyer. Each member 135 is fixedly secured to a shaft 136 mounted in bearings 137 with which the rear members 75 of the conveyer-frame are equipped. The front ends of the shafts 136 are fitted with arms or segments 138, by means of which the shafts may be turned. A rope or flexible connection 139 passes about the drum or sleeve 42ª, which forms a part of the mechanism for swinging the intermediate frame B laterally; and the ends of this rope, after passing about suitable guide-rollers 140, are connected with the arms or segments 138. The arrangement is such that when the drum 42ª is turned in such direction as to swing the rear end of the conveyer mechanism to one side of the track, the deflectors 135 will be given such inclination as to cause their lower ends to point in the direction opposite that in which the rear end of the conveyer has been swung. When the conveyer is swung in the opposite direction, the deflector-members 135 are given an opposite inclination. The result is to direct the materials to the center of a burden-car (none shown) which may be located on the track A' beneath the discharge-spout or deflectors 135. These members are connected at their lower edges by a link 135ª, so that the deflectors are compelled to move together.

The operation may be described briefly. The operator stands on the platform 72, within convenient reach of the controlling levers of the machine. After starting the motor 3, the clutch 4ᶜ is operated to connect the sprocket-wheel 4ᵇ with the continuously rotating shaft 4. The clutch 4ᶜ may be shifted by the above-mentioned lever 148. Power is communicated through the sprocket-chain 5 and imparts continuous motion to the endless conveyer and the shovel-actuating mechanism, it being noted that power is transmitted through the sprocket-chain 93 and shaft 92, so that the main gear-wheels 90 91 will be continuously rotated, thus imparting, through the pitman-rods 95, continuous rotation to the crank-shaft upon which the shovel is suspended, and imparting, through the connecting-rods 98, the power for forcing the point portion of the shovel into the materials and causing the shovel to turn about the orbitally-moving pivot on which it is suspended, so that the shovel will, after being filled, be inverted, to discharge the contents through the reciprocating-member E on the front end of the conveyer-belt. In the filling operation, the shovel moves forwardly with relation to the boom-frame, it being noted that the orbitally-moving pivot is at such time moving forwardly, and that the connecting-rods 98 are imparting a forward thrust to the point portion of the shovel, the thrust being transmitted through the triangular arms 105 and frame 104 to the shovel, the suspension links 109, at this time, resting against the front side of the frame 104. In the first part of the filling operation, the shovel naturally tilts about the pivot-shaft 110, the chain-links 121 limiting the movement of the discharge end of the shovel away from the orbitally-moving pivot 103.

During the filling operation, the shovel gradually approaches a horizontal position, with the point turning upwardly; and after the frame-member 104 has been turned on the orbitally-moving pivot 103 a limited distance, the links 115 come into play and cause the lower ends of the suspension links 109 to move away from the frame 104, so that the shovel will be eventually given the completely inverted position indicated by dotted lines in Fig. 4ª. When the shovel attains such a position that the discharge end overbalances the front end, the discharge end of the shovel falls back against the frame 104 with a jarring action, thereby causing the materials in the shovel to be loosened, so that they will fall into the member E and upon the conveyer-belt. This feature of a lost-motion connection between the shovel and its mounting is of particular importance in mucking operations, where the material is often of such nature as to tend to adhere to the shovel.

The operator controls the traction mechanism in such manner as to cause the machine to move forward at the moment that the shovel enters the materials, so that the momentum of the machine is added to the thrust imparted to the shovel by the shovel-actuating mechanism. Thus, the machine is periodically retracted and advanced, this action being timed to correspond with the action of the shovel, so that the whole machine is given a chugging action which greatly aids in the operation of filling the shovel. The propelling mechanism of the machine is controlled by the lever 71, which controls the clutches 21 and 22, in the manner hereinbefore described. The operator controls the lateral swing of the intermediate frame or body B by means of the lever 39$^a$, which controls the clutches 35 and 36, which regulate the direction of rotation of the worm-wheel 42 and the consequent direction of rotation of the vertical shaft 44, whose pinion 45 meshes with the rack 46. By this mechanism, the boom is swung laterally in either direction to enable the shovel to follow and gather the materials. The raising and lowering of the front end of the boom is controlled by the lever 40$^a$, which controls the clutches 50 and 51, which regulate the direction of rotation of the worm-wheel 55, it having been explained that power is communicated from the worm-wheel 55 to the pinion-equipped shaft 56 which operates the racks 58. The racks 58 are struck on a radius from the axis 79 about which the boom swings, and the rack 46, which forms a part of the mechanism for swinging the intermediate frame B laterally, is struck on a radius from the axis of the swivel 1, which is also true of the segmental track 1$^a$. The front end of the intermediate frame B is equipped with rollers 147, which travel on the track 1$^a$, as illustrated in Fig. 5.

The weight of the front portion of the conveyer mechanism is transmitted through the racks 58 and pinions 57 to the shaft 56; and from the shaft 56 through the ratchet-teeth 60 and pawl 61 to the worm-wheel 55, which is operated and held by the worm 54. As has been explained, the ratchet-device serves as a safety feature, enabling the front end of the boom to be elevated in case the shovel, in its descent, strikes an obstruction, so that the intermediate frame B will not be lifted from the truck, or other injury caused to the machine.

The machine described is compact, powerful, and easily controlled. The machine may be operated where the head-room is low; and the capacity of the machine for shoveling and loading is large.

It may be added that the intermediate frame B, upon which the power mechanism is mounted, may be lifted from the truck-frame, in which case the bevel gear 19$^a$ will be disengaged from the bevel-gear 24 of the gear mechanism which actuates the traction-wheels, and the pinion 45 will be disengaged from the transverse rack 46 with which the front portion of the truck is equipped; also, that the conveyer mechanism may be removed from the intermediate frame B, the journal-bearings 74 being divided to permit such removability. Also, the racks 58 of the raising and lowering mechanism may be disconnected from the pivots 59. In other words, the intermediate frame upon which the power mechanism is mounted is demountably carried by the truck; and the conveyer and shovel mechanism are demountably carried by the intermediate frame B. Thus, the three main parts of the machine may be disconnected from each other, which is a feature of much importance in introducing the machine into underground workings.

The two pairs of traction-wheels 27 are disposed under the rear portion and the intermediate portion of the truck, the wheel-base being short, so that the machine will work readily on curves of comparatively short radius. The support which the traction-wheels afford to the truck may be supplemented by the employment of a pair of small wheels 141 mounted on an axle 142 whose central portion is connected, by a reach 143, to a pivot or king-bolt 144 disposed in front of the front set of wheels 27 and carried by the truck-frame. The axle 142 is equipped with a chair or yoke 145, with which is connected a plate or bar 146, whose extremities rest upon the peripheries of the front wheels 141 and support the front portions of the side-members of the truck frame.

The foregoing detailed description has been given for clearness of understanding only, and no unnecessary limitation should be understood therefrom, but the appended claims should be construed as broadly as permissible in view of the prior art.

What I claim as new and desire to secure by Letters Patent is:—

1. In a loader, the combination of a power-actuated truck within the control of the operator, an intermediate frame surmounting said truck, vertical pivotal connections between the rear portion of said truck and the rear portion of said intermediate frame, power-actuated mechanism within the control of the operator for swinging the front end of said intermediate frame laterally, a conveyer-frame mounted in counterbalanced manner on the rear upper portion of said intermediate frame, and projecting beyond the truck at both ends, power-actuated mechanism serving to swing the conveyer-frame in a vertical direction, a conveyer associated with said conveyer-frame, a crank-shaft journaled in the front end of the conveyer-frame, a shovel having its discharge end-portion mounted on said crank-shaft, thrust-rods connected with an intermediate portion of said shovel and serving to turn the shovel about said crank-shaft, a motor mounted on said intermediate frame, and means whereby said motor serves to actuate said crank-shaft, said conveyer and said thrust-rods.

2. In a loader, the combination of a power-actuated truck within the control of the operator, an intermediate frame mounted thereon, vertical pivotal connections between the rear portion of the truck and the rear portion of said intermediate frame, power actuated mechanism within the control of the operator for swinging the front end of said intermediate frame laterally, a conveyer-frame overhanging the truck at both ends and having an inclined front portion, horizontal pivotal connections between the rear upper portion of said intermediate frame and an intermediate portion of said conveyer-frame, power-actuated mechanism within the control of the operator for swinging said conveyer-frame in a vertical plane, a conveyer mounted on said conveyer-frame, a rearwardly dumping shovel co-acting with said conveyer, shovel-actuating mechanism comprising a crank-shaft journaled in the front end of the conveyer-frame and upon which the discharge end of the shovel is mounted for orbital movement, means for rotating said shaft, and mechanism for imparting thrust to the point end of the shovel and tilting the shovel about its orbitally moving axis.

3. In a loader, the combination of a power-actuated truck within the control of the operator, an intermediate frame surmounting said truck, vertical pivotal connections between the rear portion of said truck and the rear portion of said intermediate frame, mechanism within the control of the operator for swinging the front end of said intermediate frame laterally, a conveyer-frame mounted in counterbalanced manner on the rear upper portion of said intermediate frame, a conveyer associated with said frame, a pair of gear-wheels mounted on the conveyer-frame, means for actuating said conveyer and said gear-wheels, a crank-shaft journaled in the front end of said conveyer-frame, a shovel having its discharge end mounted on said crank-shaft, means for communicating motion from said gear-wheels to said crank-shaft, and connecting rods between said gear-wheels and the lower portion of said shovel.

4. In a loader, the combination of a power-actuated truck within the control of the operator, an intermediate frame surmounting said truck, vertical pivotal connections between the rear portion of said truck and the rear portion of said intermediate frame, power-actuated mechanism within the control of the operator for swinging the front end of said intermediate frame laterally, a conveyer-frame mounted in counterbalanced manner on the rear upper portion of said intermediate frame, power actuated mechanism within the control of the operator for swinging said conveyer-frame in a vertical plane, a conveyer associated with said frame, a pair of gear-wheels mounted on the conveyer-frame, means for actuating said conveyer and said gear-wheels, a crank-shaft journaled in the front end of said conveyer-frame, a shovel having its discharge end mounted on said crank-shaft, connecting-rods for imparting motion from said gear-wheels to said crank-shaft, and connecting-rods between said gear-wheels and the lower portion of said shovel.

5. In a loader, the combination of a truck, a laterally swinging frame mounted thereon, a conveyer-frame mounted on said laterally swinging frame and comprising an inclined front section having its front end projecting in front of said truck and a rear section projecting in the rear of said truck, said sections having an articulate joint between them and co-axial pivotal connections with said laterally swinging frame, an endless conveyer mounted in the conveyer frame, a shovel and shovel-actuating mechanism mounted on the front end of the conveyer-frame, and means for actuating the conveyer and the shovel-actuating mechanism.

6. In a loader, the combination of a truck, a laterally swinging frame mounted thereon, a conveyer frame comprising an inclined front section and a rear section, pivotal connections between the adjacent ends of said sections and the rear upper portion of said laterally swinging frame, stops carried by the rear end of the front section and adapted to support the rear section, an endless conveyer mounted in said conveyer-frame, shovel mechanism mounted on the front end of the conveyer-frame and co-acting with said endless conveyer, and means for actuating the conveyer and the shovel mechanism.

7. In a loader, the combination of a truck, a laterally swinging frame mounted thereon, an inclined front conveyer-frame section, a rear conveyer-frame section, pivotal connections between said sections and the rear upper portion of said laterally swinging frame, shoulders on said sections whereby the rear section will tend to counterbalance the front section, shoulders carried by the rear portion of said laterally swinging frame and adapted to support said rear section when the front end of the front section is unduly elevated, an endless conveyer mounted on said conveyer-frame, shovel mechanism mounted on the front end of said conveyer-frame, and means for actuating the conveyer and the shovel mechanism.

8. In a loader, the combination with an endless conveyer of an orbitally moving pivot disposed above the plane of the conveyer and near the front end thereof, a shovel having connections near its discharge end with the orbitally moving pivot, and mechanism connected with said shovel toward its point end for imparting thrust to the point of the shovel and tilting the shovel about its orbitally moving axis.

9. In a loader, the combination with an endless conveyer, of an offset horizontal shaft journaled in the extremity of the conveyer-frame, a rearwardly-discharging shovel comprising a substantially vertical back and a forwardly turned point, said shovel having its discharge end orbitally carried by said offset shaft, mechanism for rotating said shaft, and mechanism connected with said shovel between its orbitally moving support and its point and serving to tilt the shovel about its orbitally moving axis.

10. In a loader, the combination with a conveyer, of an orbitally moving pivot near the front end of the conveyer, a shovel-mounting journaled on said pivot, a shovel carried by said mounting and capable of limited movement with relation thereto, and mechanism connected with said shovel-mounting some distance below the journaled portion of the mounting and serving to impart turning movement of the shovel-mounting with relation to said orbitally moving pivot.

11. In a loader, the combination with an endless conveyer, of an orbitally moving pivot near the front end thereof, a shovel-mounting journaled on said pivot, a shovel movably mounted on said mounting and capable of a limited tilting movement with relation to the mounting, and thrust mechanism connected with said shovel-mounting some distance below the journaled portion of the mounting for imparting turning movement of the shovel-mounting on the orbitally-moving pivot.

12. In a loader, the combination with a conveyer, of an orbitally moving pivot, a shovel-mounting freely suspended thereon, a shovel pivotally connected with said mounting at an intermediate portion of the shovel, lost-motion connections between the discharge end of the shovel and said shovel-mounting, and thrust mechanism connected with said shovel-mounting some distance below its point of suspension for imparting turning movement of the shovel-mounting with relation to said orbitally moving pivot.

13. In a loader, the combination with a conveyer, of a rotating crank-shaft journaled near the front end of the conveyer and affording an orbitally-moving pivot, a shovel-mounting suspended from said orbitally-moving pivot, thrust rods connected with said shovel-mounting, a shovel tiltably connected intermediate its ends with said mounting, and means for actuating said thrust-rods.

14. In a machine of the character set forth, the combination with a boom, of an orbitally-moving pivot mounted at the front end thereof, a shovel-mounting suspended from said pivot, a shovel movably mounted on said mounting and capable of limited tilting movement with relation to the mounting, means for imparting thrust through said shovel-mounting to the point portion of the shovel and turning the shovel-mounting on the orbitally-moving pivot, and means for imparting further turning movement of the shovel about said orbitally-moving pivot.

15. In a loader, the combination with an endless conveyer, of an orbitally-moving pivot near the front end thereof, a shovel-mounting suspended from said pivot, suspension links carried by said mounting, a shovel having an intermediate portion pivotally connected with the lower ends of said links, lost motion connections between the discharge end of the shovel and the upper portion of said mounting, connecting-rods having their front ends pivotally connected with said shovel-mounting and having also connections with said suspension-links capable of swinging the links with relation to the mounting, and means for actuating said connecting-rods.

16. In a loader, the combination with an endless conveyer, of an orbitally-moving pivot near the front end thereof, a shovel suspended from said pivot and capable of limited shifting movement with relation to the pivot, and thrust-rods connected with said shovel below said pivot and serving to impart thrust to the point portion of the shovel and to turn the shovel about the orbitally-moving pivot.

17. In a loader, the combination with an endless conveyer, of an orbitally-moving pivot near the front end thereof, a shovel-mounting suspended thereon, suspension-links connected with the upper portion of said shovel-mounting, a shovel pivotally connected with the lower portions of said links, means for limiting the movement of the discharge end of the shovel with relation to the upper portion of said mounting, connecting-rods having pivotal connections with said shovel-mounting, and connecting-links between the lower portions of said suspension-links and offset portions of said connecting-rods.

18. In a loader, the combination with an endless conveyer, of an orbitally-moving pivot near the front end thereof, a shovel-mounting suspended from said pivot and having rearwardly-extending arms, a shovel wholly carried by said mounting and having its discharge end disposed near said orbitally-moving pivot and having its point portion projecting below said mounting, and connecting-rods having their front ends joined to said rearwardly-extending arms.

19. In a loader, the combination with an endless conveyer, of a shovel at the front end thereof, power-actuated mechanism mounted on the front end of the frame of said conveyer and having means to thrust the shovel forwardly and elevate and tip it rearwardly, and an oscillating distributing device mounted above the front end of the conveyer, which receives the material from the discharge end of the shovel and distributes it upon the conveyer.

20. In a loader, the combination with an endless conveyer, of a shovel disposed at the front end of the conveyer mechanism, shovel-actuating mechanism mounted on the front end of the conveyer-mechanism and having means to thrust the shovel forwardly and then elevate and tilt it rearwardly, and an oscillating distributing device actuated by the shovel-actuating mechanism and disposed above the front end of the conveyer and receiving the discharged materials from the shovel and distributing them upon the conveyer.

21. The combination of a conveyer-frame, an endless conveyer mounted thereon, a reciprocating distributing device disposed over the front end of said endless conveyer and having sliding connection with the conveyer-frame, a shovel disposed at the front end of the conveyer, shovel-actuating mechanism mounted on the front end of the conveyer-frame, and connections between the shovel-actuating mechanism and said reciprocating distributing device.

22. In a loader, the combination of a vertically swinging boom, a power-actuated shovel mounted on said boom, and mechanism for raising and lowering said boom, including safety means for automatically permitting relative movement between said frame and the actuating mechanism in the event that the downward movement of the shovel is obstructed in such manner as to elevate or hold said boom.

23. In means of the character set forth, the combination of a shovel, a vertically swinging boom carrying said shovel, a rack through the medium of which said boom is swung in a vertical plane, a platform on which said boom is mounted, a pinion for actuating said rack, and means for applying power to said pinion, including safety means permitting slippage in the event that said shovel encounters such obstruction as to lift or hold the vertically swinging boom.

24. In a loader, the combination of a power-actuated truck, a laterally swinging intermediate frame, a boom mounted on said intermediate frame, means for swinging said intermediate frame laterally, a power-actuated shovel mounted on said boom, and mechanism for raising and lowering said boom, including a shaft and gear with an interposed ratchet-device arranged to permit slippage in the event that said shovel encounters an obstruction in its descent.

25. The combination with a boom, and means for controlling the position of said boom, of an orbitally-moving pivot carried by the front end of said boom, a shovel suspended from and having its discharge end portion connected with said pivot, connecting-rods serving to impart thrust to the point portion of said shovel, and means for reciprocating said connecting-rods.

26. The combination with a boom and means for regulating the position thereof, of a crank-shaft journaled in the front end of said boom, a pair of gear-wheels journaled at the sides of said boom, means for communicating rotary motion from said gear-wheels to said crank-shaft, a shovel having its discharge end portion mounted on said crank-shaft, and connecting-rods between said gear-wheels and an intermediate portion of the shovel for imparting thrust to the point portion of the shovel and turning the shovel about its orbitally-moving pivot.

27. The combination of a boom and means for regulating the position of same, of a crank-shaft journaled in the front end of said boom, gear-wheels disposed inside of the side-members of the boom and equipped with crank-disks disposed outside of the side-members of the boom, connecting-rods joining the crank-disks to the crank-shaft, a shovel having its discharge end portion pivotally connected with the crank-shaft, connecting-rods having their rear ends connected with said gear-wheels and having their front ends connected with an intermediate portion of the shovel so as to impart thrust to the point portion of the shovel, and means for rotating said gear-wheels.

28. In a machine of the character set forth, the combination with shovel-actuating mechanism provided with a shovel-pivot, of a shovel-mounting having means for suspending the same from said pivot, a shovel having limited oscillation with relation to said mounting, and means connected with shovel-mounting below its point of suspension for turning the shovel-mounting with relation to its pivot.

29. In a machine of the character set forth, the combination with shovel-actuating mechanism, including a moving pivot for the discharge end of the shovel and connecting rods for imparting thrust to the point portion of the shovel, of a shovel-mounting suspended on said pivot, suspension links connected with the upper portion of said mounting, a shovel having an intermediate portion connected with the lower end of said links and having its upper end capable of limited movement with relation to said pivot, connections between said connecting-rods and said shovel-mounting, connecting-links between said connecting-rods and the free ends of said suspension-links, and offset connections between said connecting-rods and said connecting-links, whereby the suspension-links will be turned with relation to the shovel-mounting in the operation of carrying the shovel to the dumping position.

30. In a machine of the character set forth, the combination of a truck, an intermediate frame having swivel connection at its rear portion with the rear portion of said truck, a substantially horizontal rack carried by the front portion of the truck, a vertical shaft equipped with a pinion engaging said rack, a worm-wheel equipped with a bevel-gear through the medium of which said vertical shaft may be actuated, a boom having trunnion connections with the rear upper portion of said intermediate frame, a power-actuated shovel mounted on the front end of said boom, racks connected with said boom, a worm-wheel in axial alinement with said first-named worm-wheel, a shaft extending through said worm-wheels and equipped with pinions engaging said second-named racks, connections between said second-named worm-wheel and said shaft, worms serving to actuate said worm-wheels, and means whereby each of said worms may be actuated in either direction.

31. In a machine of the character set forth, the combination of a truck, an intermediate frame having swivel connection therewith, a conveyer-frame having trunnion connections with said intermediate frame, an endless conveyer mounted in said conveyer-frame, shovel mechanism mounted on the front end of said conveyer-frame, a shaft co-axial with the trunnion connections of said conveyer-frame through which power is imparted to the conveyer and the shovel-mechanism, a substantially horizontal rack carried by the front portion of the truck, a vertical shaft geared to said rack, a pair of racks connected with the conveyer-frame, a shaft equipped with pinions engaging said second-named racks, a worm-wheel journaled on said second-named shaft and equipped with means for actuating said vertical shaft, a second worm-wheel journaled on said second-named shaft, ratchet connections between said second-named worm-wheel and said shaft, a pair of worms engaging said worm-wheels, a motor mounted on said intermediate frame, means for communicating motion from said motor to each of said worms in either direction, and means for communicating motion from said motor to said first-named shaft.

32. In a loading machine, the combination of a truck equipped with traction-wheels and gear mechanism for actuating the same, said truck being equipped also with a transverse rack, an intermediate frame demountably swiveled on said truck and equipped with gear mechanisms co-acting with said first-named gear mechanism and said rack, a conveyer-frame demountably trunnioned on said intermediate frame, a conveyer mounted in said conveyer-frame, shovel mechanism mounted on the front portion of said conveyer-frame, racks connected with said conveyer-frame, raising and lowering mechanism mounted on said intermediate frame and engaging said second-named racks, a motor mounted on said intermediate frame, and means for transmitting motion from said motor to said conveyer and to the gear mechanisms and the raising and lowering mechanism mounted on the intermediate frame.

33. In a loader, the combination of a truck equipped with traction-wheels and gear mechanism for actuating the same and equipped also with a transverse rack, an intermediate frame demountably swiveled on said truck, power mechanism mounted on said intermediate frame and having gear mechanisms withdrawably engaging said first-named gear mechanism and said rack, conveyer mechanism superposed over said intermediate frame and demountably trunnioned thereon, means for communicating motion from the power mechanism to the conveyer of said conveyer mechanism, and a rack depending from the frame of the conveyer mechanism and engaging a gear of the power mechanism, said last-named rack being disconnectible.

34. In a loader, the combination of a truck equipped with traction wheels and gear mechanism for actuating the same and equipped also with a transverse rack, an intermediate frame demountably swiveled on said truck, power mechanism mounted on said intermediate frame and having gear mechanisms withdrawably engaging said first-named gear mechanism and said rack, conveyer mechanism demountably trunnioned on said intermediate frame, means for communicating motion from the power mechanism to the conveyer of said conveyer mechanism, and a rack depending from the frame of the conveyer mechanism and engaging a gear of the power mechanism.

35. The combination of a conveyer-frame having an intermediate portion supported by trunnions, a shaft concentric with said trunnions, means for actuating said shaft, means for regulating the position of the conveyer-frame, an endless conveyer mounted on the conveyer-frame, a crank-shaft journaled in the front end of the conveyer-frame, a pair of gear-wheels journaled at the sides of said conveyer-frame, means for communicating rotary motion from said gear-wheels to said crank-shaft, a shovel having its discharge end-portion mounted on said crank-shaft, connecting rods between said gear-wheels and an intermediate portion of the shovel for imparting thrust to the point portion of the shovel and turning the shovel about its orbitally-moving pivot, and means for transmitting power from said shaft to said endless conveyer and to said gear-wheels.

36. In a loader, the combination of a truck equipped with traction-wheels and gear mechanism for actuating the same and equipped also with a transverse rack, an intermediate frame demountably swiveled on said truck, power mechanism mounted on said intermediate frame and having gear mechanisms withdrawably engaging said first-named gear mechanism and said rack, conveyer mechanism demountably trunnioned on said intermediate frame, shovel-actuating mechanism mounted on the front end of the conveyer mechanism, a rearwardly dumping shovel carried thereby, a shaft journaled concentric with the trunnions of the conveyer mechanism and geared to the conveyer and shovel-actuating mechanism, means for communicating motion from the power mechanism to said shaft, and a rack depending from the frame of the conveyer mechanism and engaging a gear of the power mechanism.

37. In a loader, the combination of a truck, an intermediate frame swiveled thereon, power mechanism mounted on said intermediate frame, means mounted on the intermediate frame and actuated by said power mechanism for swinging the intermediate frame laterally, a conveyer-frame having an intermediate portion trunnioned on said intermediate frame and comprising an inclined front portion projecting in front of the truck and a rear section projecting in the rear of the truck, an endless conveyer mounted in said conveyer-frame, shovel-actuating mechanism mounted on the front portion of the conveyer-frame, a shovel carried thereby, means for transmitting power from said power mechanism to the conveyer and shovel-actuating mechanism, including a shaft concentric with the trunnions of the conveyer-frame, mechanism mounted on the intermediate frame and adapted to be actuated by said power mechanism for swinging the conveyer-frame about its horizontal trunnions, and automatically-actuated discharge mechanism carried by the rear end of the conveyer-frame and operating to direct the materials discharged from the conveyer mechanism toward a central point, regardless of the position of the conveyer mechanism.

38. In a loader, the combination of a frame having a vertical swivel, means for swinging said frame laterally, a conveyer frame having an intermediate portion trunnioned on said first-named frame above the swivel thereof, an endless conveyer mounted in said conveyer-frame, a shaft concentric with the trunnions of said conveyer-frame, power mechanism mounted on the intermediate frame and geared to said shaft, shovel-actuating mechanism mounted on the front portion of the conveyer-frame, a shovel carried thereby, means for transmitting power from said shaft to said endless conveyer and shovel-actuating mechanism, discharge mechanism movably mounted on the rear portion of the conveyer-frame and serving to direct the materials discharged from the conveyer-mechanism toward a central point regardless of the position of the conveyer-mechanism, and means for transmitting motion from said power-mechanism to said discharge mechanism.

39. The combination with a conveyer frame, an endless conveyer mounted thereon and means for supporting and advancing the conveyer, of a crank-shaft journaled in the front end of said conveyer frame, a shovel having its discharge end mounted on said crank-shaft, a pair of gear-wheels mounted on said conveyer frame, means for communicating motion from said gear-wheels to the said crank-shaft, connecting rods between said gear-wheels and the lower portion of said shovel, and means for actuating said conveyer, and said gear-wheels.

40. In a loader, a supporting frame, a conveyer frame mounted thereon and comprising an inclined front section having its front end projecting in front of said supporting frame and having its rear section projecting in the rear of said supporting frame, said sections having an articulate joint between them and coaxial pivotal connections with said supporting frame, an endless conveyer mounted in the conveyer frame, an orbitally moving pivot disposed above the plane of the conveyer and carried by the front end of said conveyer frame, a shovel having connections near its discharge end with the orbitally moving pivot, and mechanism carried by said conveyer frame and connected with said shovel toward its front end for imparting thrust to the point of the shovel and tilting the shovel about its orbitally moving axis.

41. In a loader, the combination with a supporting frame, an inclined front conveyer frame section, a rear conveyer frame section, pivotal connections between said sections and the rear upper portion of said supporting frame, shoulders on said sections whereby the rear section may tend to counterbalance the front section, shoulders carried by the rear portion of said supporting frame and adapted to support said rear section when the front end of the section is unduly elevated, an endless conveyer mounted on said conveyer frame, shovel mechanism mounted on the front end of said conveyer frame, and means for actuating the conveyer and the shovel mechanism.

42. In a loader, the combination of a frame, an orbitally moving pivot supported by said frame, a shovel-mounting journaled on said pivot, a shovel carried by said mounting and capable of limited movement with relation thereto, and mechanism connected with said shovel mounting some distance below the journaled portion of the mounting and serving to impart turning movement of the shovel mounting with relation to said orbitally moving pivot.

43. In a loader, the combination with a frame, of an orbitally moving pivot, a shovel mounting freely suspended thereon, a shovel pivotally connected to said mounting at an intermediate portion of the shovel, lost motion connections between the discharge end of the shovel and said shovel mounting, and thrust mechanism connected with said shovel mounting some distance below its point of suspension for imparting turning movement of the shovel mounting with relation to said orbitally moving pivot.

44. In a loader, the combination with a frame, of an orbitally moving pivot, a shovel mounting suspended from said pivot, suspension links carried by said mounting, a shovel having an intermediate portion pivotally connected with the lower ends of said links, lost motion connections between the discharge end of the shovel and the upper portion of said mounting, connecting rods having their front ends pivotally connected with said shovel mounting, and means for actuating said connecting rods.

45. In a loader, an orbitally moving pivot, a shovel mounting suspended thereon, suspension links connected with the upper portion of said shovel mounting, a shovel pivotally connected with the lower portions of said links, means for limiting the discharge end of the shovel with relation to the upper portion of said mounting, connecting rods having pivotal connections with said shovel mounting, and connecting links between the lower portions of said suspension links and offset portions of said connecting rods.

46. In a loader, the combination of a truck, an intermediate frame swiveled thereon, power mechanism mounted on said intermediate frame, means mounted on the intermediate frame and actuated by said power mechanism for swinging the intermediate frame laterally, a conveyer frame having an intermediate portion trunnioned on said intermediate frame and comprising an inclined front portion projecting in front of the truck, and a rear section projecting in the rear of the truck, an endless conveyer mounted in said conveyer frame, mechanism mounted on the front end of the conveyer frame for delivering materials to said endless conveyer, means for transmitting power from said power mechanism to said conveyer and the mechanism for delivering the materials thereto, including a shaft concentric with the trunnions of the conveyer frame, mechanism mounted on the intermediate frame and adapted to be actuated by said power mechanism for swinging the conveyer frame about its horizontal trunnions, and automatically actuated discharge mechanism carried by the rear end of the conveyer frame and operating to direct the materials discharged from the conveyer mechanism toward a central point, regardless of the position of the conveyer mechanism.

47. In a loader, the combination of a conveyer frame, an endless conveyer mounted thereon, mechanism mounted on the front end of said conveyer frame for delivering materials to the endless conveyer, mechanism for swinging the conveyer in a horizontal plane, and automatically actuated discharge mechanism carried by the rear end of the conveyer frame and operating to direct the materials discharged from the conveyer mechanism to a central point, regardless of the position of the conveyer mechanism.

48. In a loader, the combination of a frame having a vertical swivel, means for swinging said frame laterally, a conveyer frame having an intermediate portion trunnioned on said first named frame above the swivel thereof, an endless conveyer mounted in said conveyer frame, a shaft concentric with the trunnions of said conveyer frame, power mechanism mounted on the swiveled frame and geared to said shaft, mechanism mounted on the front portion of the conveyer frame and serving to deliver materials to the endless conveyer, means for transmitting power from said shaft to said endless conveyer and to the mechanism for delivering the materials thereto, discharge mechanism movably mounted on the rear portion of the conveyer frame and serving to direct the materials discharged from the conveyer mechanism to a central point, regardless of the position of the conveyer mechanism, and means for transmitting motion from said power mechanism to said discharge mechanism.

49. In a loader, the combination of a power-actuated truck within the control of the operator, an intermediate frame surmounting said truck, vertical pivotal connections between the rear portion of said truck and the rear portion of said intermediate frame, power-actuated mechanism within the control of the operator for swinging the front end of said intermediate frame laterally, a conveyer frame mounted in counterbalanced manner on the rear upper portion of said intermediate frame and having sections projecting beyond the truck at both ends, power-actuated mechanism serving to swing the conveyer frame in a vertical direction, a conveyer associated with said conveyer frame, mechanism on the front end of said conveyer frame serving to deliver materials to said conveyer, and automatically actuated discharge mechanism mounted on the rear end of said conveyer frame and serving to automatically direct the discharged materials toward a central point, regardless of the lateral swing of said conveyer frame.

50. A loading machine having a main frame, an intermediate frame swiveled thereon, connecting means permitting the intermediate frame to be lifted from the main frame, a conveyer and loading means therefor pivoted to the intermediate frame, and means whereby said conveyer and loading means may be detached as a unit from said intermediate frame.

VIGGO G. HALBY.

In presence of—
NELLIE B. DEARBORN,
K. O'NEILL.